(12) United States Patent
Fechner

(10) Patent No.: US 11,396,824 B2
(45) Date of Patent: Jul. 26, 2022

(54) MEASURING DEVICE AND METHOD FOR AN AIRCRAFT ENGINE AND AN AIRCRAFT ENGINE

(71) Applicant: Rolls-Royce Deutschland Ltd & Co KG, Blankenfelde-Mahlow (DE)

(72) Inventor: Stefan Fechner, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 45 days.

(21) Appl. No.: 17/003,516

(22) Filed: Aug. 26, 2020

(65) Prior Publication Data

US 2021/0062674 A1 Mar. 4, 2021

(30) Foreign Application Priority Data

Aug. 29, 2019 (DE) ..................... 10 2019 123 240.6

(51) Int. Cl.
*F01D 17/08* (2006.01)
*F01D 21/00* (2006.01)
*B64D 27/10* (2006.01)

(52) U.S. Cl.
CPC ........... *F01D 17/085* (2013.01); *B64D 27/10* (2013.01); *F01D 17/08* (2013.01); *F01D 21/003* (2013.01); *F05D 2220/323* (2013.01); *F05D 2220/3212* (2013.01); *F05D 2240/12* (2013.01); *F05D 2240/50* (2013.01); *F05D 2240/55* (2013.01); *F05D 2260/605* (2013.01); *F05D 2260/6022* (2013.01); *F05D 2260/80* (2013.01); *F05D 2270/80* (2013.01)

(58) Field of Classification Search
CPC ........ F01D 17/08; F01D 17/085; F01D 9/041; F01D 21/003
See application file for complete search history.

(56) References Cited

U.S. PATENT DOCUMENTS 3,348,414 A * 10/1967 Waters .................... G01K 13/02
374/115
2005/0042075 A1* 2/2005 Yang ..................... F01D 21/003
415/115
2008/0187436 A1 8/2008 Leogrande et al.
(Continued)

FOREIGN PATENT DOCUMENTS

| DE | 102015226732 A1 | 6/2017 | |
| GB | 1325223 A | 8/1973 | |
| GB | 2226366 A * | 6/1990 | ........... F01D 17/085 |

OTHER PUBLICATIONS

German Search Report dated Apr. 1, 2020 from counterpart German Patent Application No. 10 2019 123 240.6.

*Primary Examiner* — Topaz L. Elliott
(74) *Attorney, Agent, or Firm* — Shuttleworth & Ingersoll, PLC; Timothy J. Klima

(57) ABSTRACT

The invention relates to a measuring device for an aircraft engine, characterized by at least one probe device for measuring a physical and/or chemical state in at least one measuring space within the aircraft engine, wherein the at least one measuring space is fluidically connected to a cavity, and at least one air-conducting device, which is fluidically coupled to the cavity in such a manner that a fluid flow, in particular a gas flow, can be removed from the at least one cavity to a pressure sink. The invention also relates to an aircraft engine and to a measuring method.

16 Claims, 5 Drawing Sheets

(56) References Cited

U.S. PATENT DOCUMENTS

| | | | |
|---|---|---|---|
| 2008/0291964 A1 | 11/2008 | Schrimpling et al. | |
| 2011/0002774 A1* | 1/2011 | Karafillis | F04D 29/162 415/118 |
| 2013/0340443 A1* | 12/2013 | Salles | G02B 23/2492 60/803 |
| 2015/0093244 A1* | 4/2015 | Wigen | G01K 13/028 416/61 |
| 2016/0252017 A1* | 9/2016 | Schesny | F02C 9/28 60/773 |
| 2017/0184472 A1* | 6/2017 | Fechner | G01M 15/14 |
| 2018/0348069 A1 | 12/2018 | Tan | |
| 2021/0239277 A1* | 8/2021 | Szarvasy | G01K 13/02 |

* cited by examiner

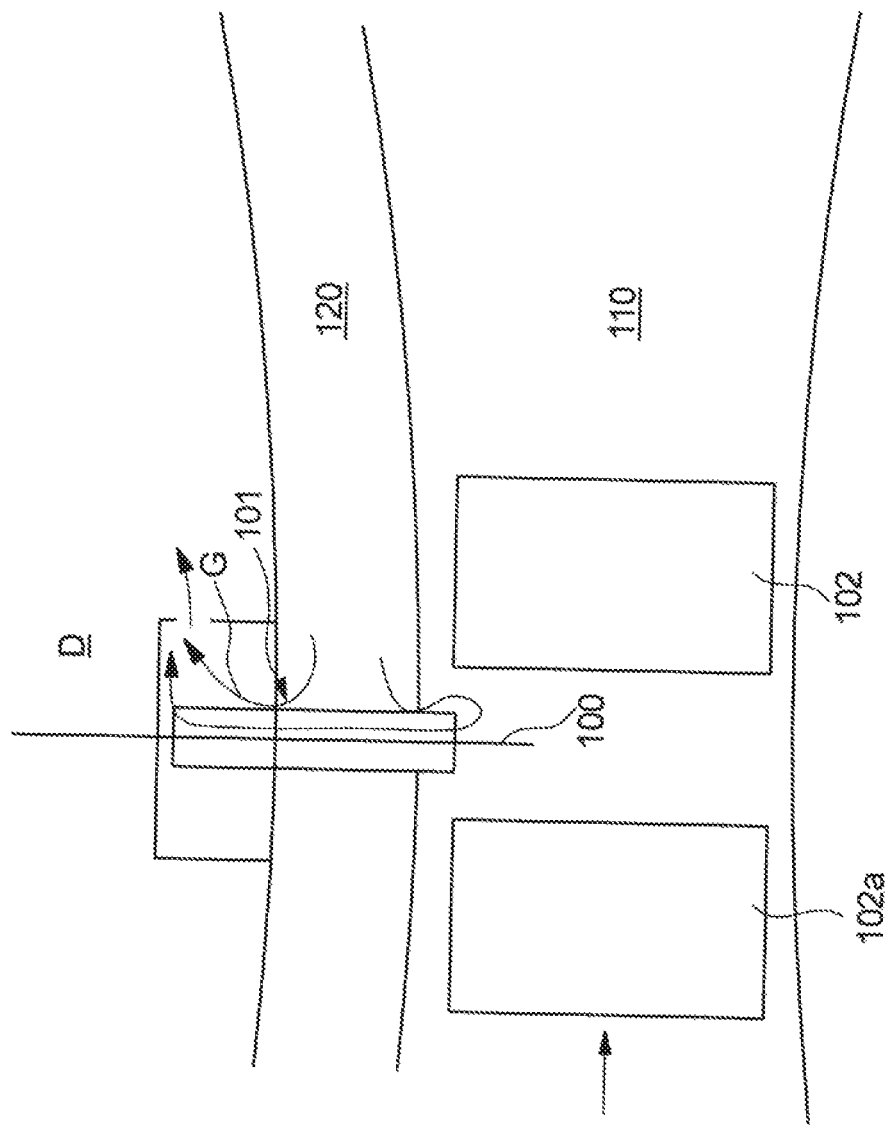

MEASURING DEVICE AND METHOD FOR AN AIRCRAFT ENGINE AND AN AIRCRAFT ENGINE

This application claims priority to German Patent Application DE102019123240.6 filed Aug. 29, 2019, the entirety of which is incorporated by reference herein.

The present disclosure relates to a measuring device for an aircraft engine to an aircraft engine and to a measuring method for an aircraft engine having features as disclosed herein.

Aircraft engines are complex devices, the operation of which requires a multiplicity of sensors for gathering measurement values. One example of a sensor system of this type is described in US 2008/291964 A1.

Measurements with sensors, for example for a temperature, can be undertaken in cavities (referred to below as measuring space) in the interior of the aircraft engine, the measurements frequently being made difficult due to leakage flows, i.e. fluid, for example gas or air, unintentionally entering from cavities which are arranged as necessitated by the design and through which the sensor is guided. This distorts the measurement values and ultimately makes control of the aircraft engine difficult. However, an Engine Health Management, which requires a measurement value recording for longer periods, is also adversely affected as a result.

It is therefore the object to create devices and methods permitting measurements which are more accurate.

Use is made here of at least one probe device for measuring a physical and/or chemical state in at least one measuring space within the aircraft engine, wherein the at least one measuring space is fluidically connected to a cavity. A leakage flow can flow from said cavity into the measuring space during the operation of the aircraft engine.

At least one air-conducting device is designed and configured here to have a fluidic coupling, via which a gas flow (generally an air flow or else a liquid) can be removed from the at least one cavity to a pressure sink. A pressure sink here is a region in or else outside the aircraft engine, in which a lower pressure prevails at the respective point in time than in the cavity. This pressure difference permits air to be sucked out of the cavity. The suction here should as far as possible be undertaken in such a manner that there is an at least sufficient equal pressure gradient between the measuring space and the cavity such that the leakage flow does not flow to the measuring space, but rather to the pressure sink.

It is possible here that, for example, the air-conducting device as a fluidic connection has a duct and/or an opening in a wall between the cavity and the pressure sink. An outward flow can therefore take place in a controlled manner.

The at least one probe device which is used in the measuring device can have a sensor for temperature, pressure, particles and/or a chemical composition. All of these parameters can play a role individually or in combination in the monitoring and control of the aircraft engine.

In one embodiment, the at least one measuring space is arranged in a static part of the aircraft engine, i.e. it is not located in a component rotating with the drive.

In one embodiment, the at least one measuring space is arranged in a vane of a turbine and/or of a compressor of the aircraft engine. The temperature is monitored at least in some vanes, and therefore it is expedient to minimize leakage flows. The vane here can be in particular the first static vane of a low-pressure turbine in the flow direction.

It is also possible for the at least one measuring space to be designed as an annular space between two turbine stages and/or compressor stages. Alternatively or additionally, a bearing can be arranged in the at least one measuring space. The monitoring of temperatures in the vicinity of bearings may be expedient in order to prevent damage to the bearings. The same is true of embodiments in which the at least one measuring space is part of a rotating seal, in particular of a labyrinth seal. Temperatures are monitored here in order to establish whether the seal is still functioning.

Furthermore, in one embodiment, the at least one measuring space can be arranged in an engine nacelle of the aircraft engine.

In principle, the at least one measuring space and/or the cavity can be part of the secondary air supply system of the aircraft engine, in particular of an internal cooling and blockage air system.

The object is also addressed by the subject matter as disclosed herein.

Embodiments will now be described by way of example, with reference to the figures, in which:

FIG. 1 shows a schematic sectional view through an aircraft engine;

FIGS. 2A, B show a schematic illustration of a static vane without and with an embodiment of a measuring device;

FIGS. 3A, B show a sectional view of a static vane without and with an embodiment of a measuring device;

FIG. 5 shows a detailed view of an embodiment of a measurement in an annular space.

Before embodiments of a measuring device are described, first of all the basic design of an aircraft engine 10 is described.

Figure 1:
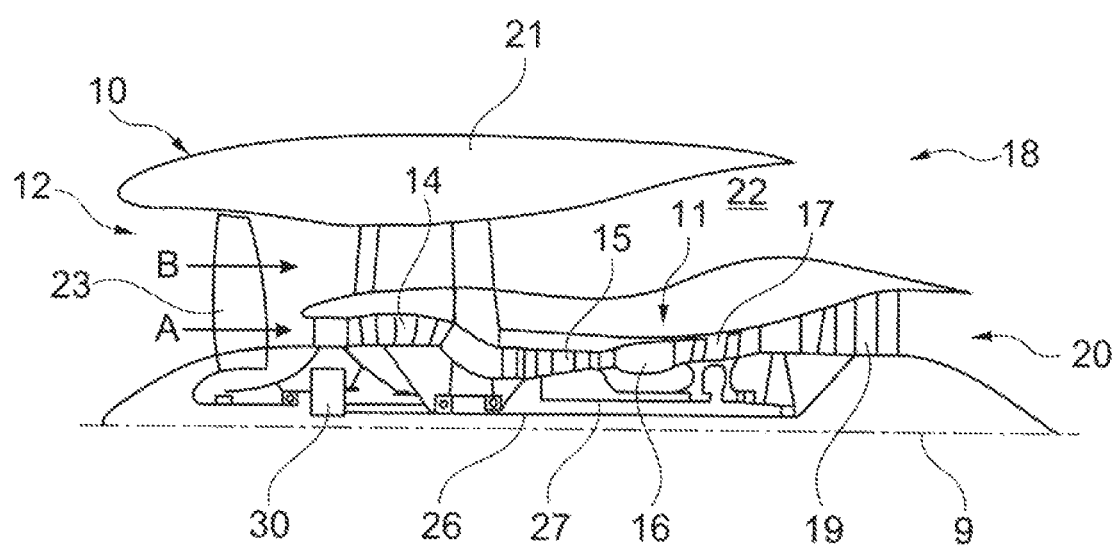

FIG. 1 illustrates an aircraft engine 10 having a main axis of rotation 9. The aircraft engine 10 comprises an air inlet 12 and a fan 23, which produces two air flows: a core air flow A and a bypass air flow B. The gas turbine engine 10 comprises a core engine 11, which receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary transmission 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before they are expelled through the nozzle 20 to provide a certain propulsive thrust. The high-pressure turbine 17 drives the high-pressure compressor 15 by means of a suitable connection shaft 27. The fan 23 generally provides the major part of the propulsive thrust. The epicyclic planetary transmission 30 is a reduction gear.

It is noted that the terms "low-pressure turbine" and "low-pressure compressor" as used herein may be taken to mean the lowest-pressure turbine stage and lowest-pressure compressor stage (i.e. not including the fan 23) respectively, and/or the turbine and compressor stages that are connected together by the connecting shaft 26 with the lowest rotational speed in the engine (i.e. not including the transmission output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

This form of an aircraft engine 10, which is also referred to as a transmission fan engine, is illustrated here merely by way of example since the embodiments for the measuring device are basically usable even in aircraft engines 10 without a transmission 30.

In an aircraft engine 10, measurements are undertaken here at different locations for different purposes, with, for example, a probe device 100 serving to measure a temperature in a measuring space 110.

Figure 2A:
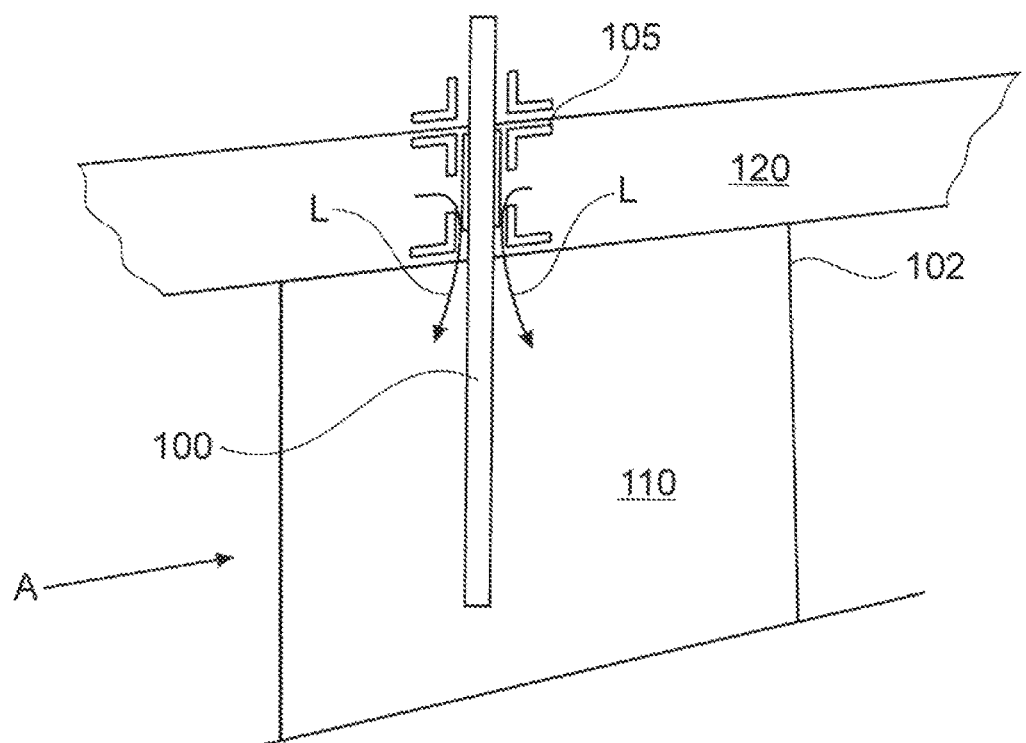

FIG. 2A illustrates a stationary vane 102, in which a probe device 100 measures the temperature in the measuring space 110 of the vane 102. The vane 102 is part of a turbine 17, 19 of the aircraft engine 10 and can be in particular the first vane 102 of the low-pressure turbine 19.

In the embodiment illustrated, the vane 102 is approached by the core air flow A. Above the duct for the core air flow A, a bearing device 105 for the pivotably designed vane 102 is arranged in an adjacent cavity 120. Since, however, the vane 102 does not rotate with the drive, i.e. does not rotate about the main axis of rotation 9, the vane can be understood as being a static component.

The cavity 120 here is a type of annular space in the aircraft engine 10 that is filled with air or through which air of the secondary air supply system flows.

The secondary air supply system is that part of the air conduction in an aircraft engine 10 which does not serve directly for the propulsion. In other embodiments, the cavity 120 can be a sealed space or a duct through which air flows. In each case, the cavity 120 is fluidically connected to the measuring space 110, i.e. a gas (air) can flow from the cavity 120 into the measuring space 110 (leakage).

In the illustration according to FIG. 2A, an air flow flows from the cavity 120 in the form of a leakage flow L into the measuring space 110 of the vane 102 since the local pressure in the measuring space 110 is lower than in the cavity 120. This ultimately distorts the measurement results of the probe device 100.

Figure 2B:
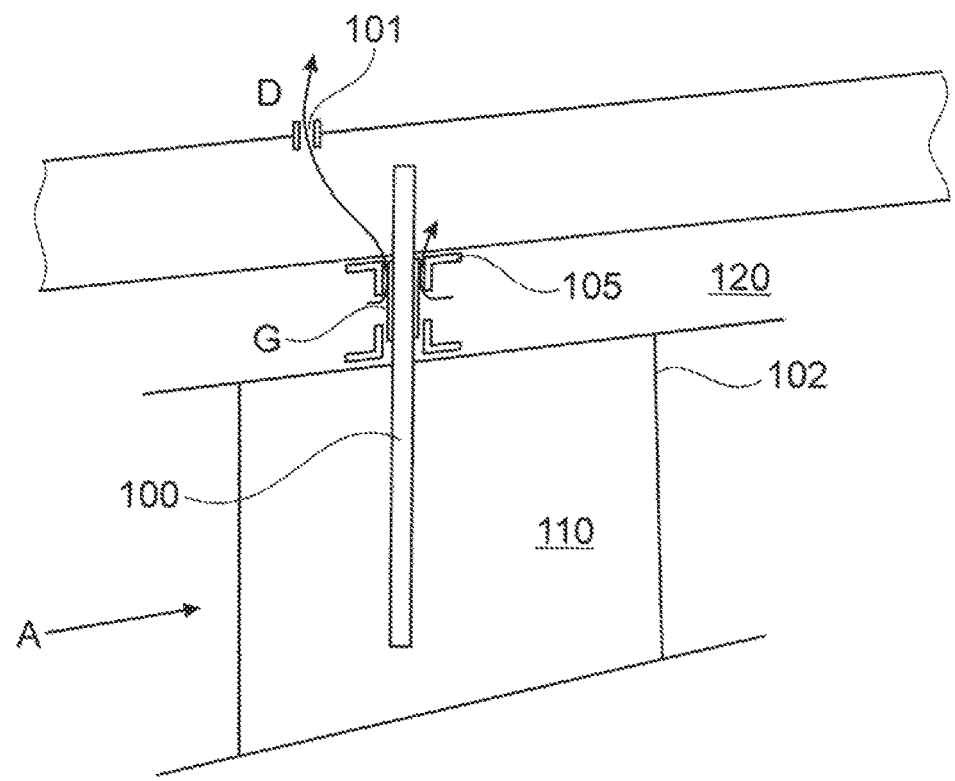

FIG. 2B illustrates an embodiment of a measuring device, in which the cavity 110 is coupled to at least one air-conducting device 101 in such a manner that a fluid flow, here a gas flow G (air) in the region of the bearing device 105, by flowing off to the pressure sink D, is prevented from penetrating the at least one cavity 110. The air-conducting device 101 is a fluidic coupling between the cavity 120 and the pressure sink D.

The air-conducting device 101 here is a duct which produces the fluidic connection to the region with a lower pressure than in the cavity 110. Thus, for example, the bypass duct 22 (not illustrated here) can serve as a pressure sink D. A lower pressure prevails in the region of the pressure sink D than in the cavity 120, and therefore a leakage flow L into the measuring space 110 is prevented. Typically, regions in the aircraft engine 10 that are exposed to a small pressure increase within the engine and to a high flow velocity are suitable as pressure sinks D since the local pressure there is the lowest, according to Bernouilli's principle. It is also possible to use a region which is exposed to atmospheric pressure in flight as a pressure sink D.

In principle, the measuring space 110 may also be of a more complex form than illustrated here.

Figure 3A:
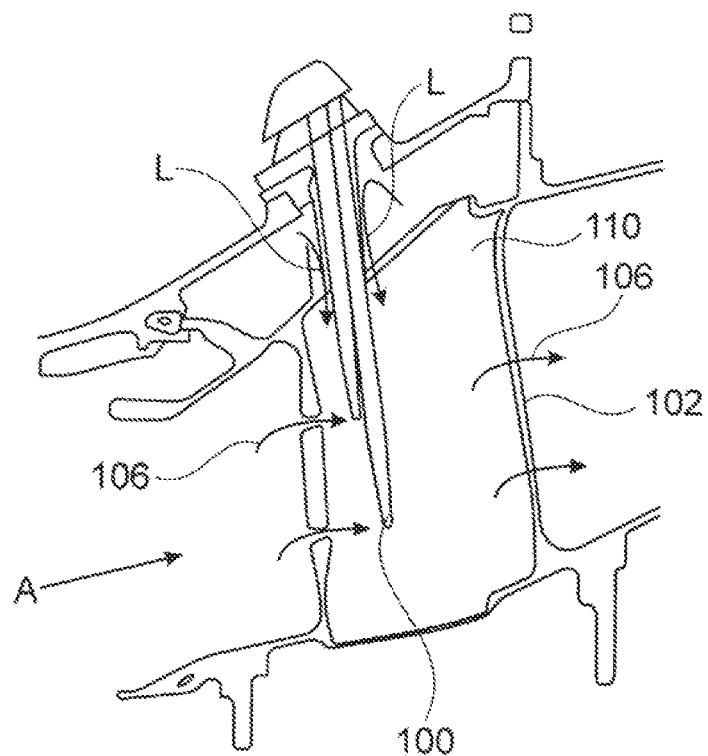
Figure 3B:
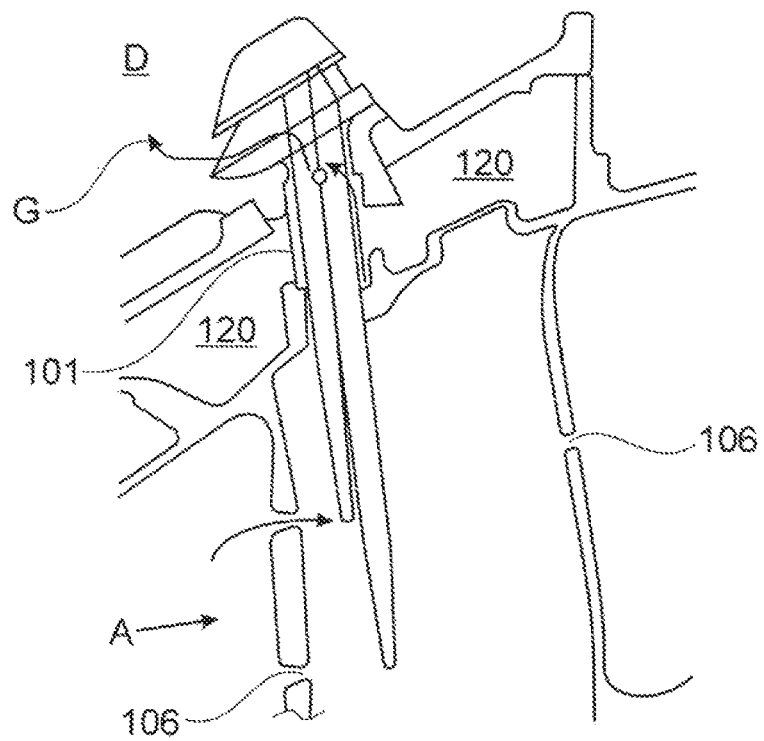

FIGS. 3A and 3B likewise illustrate a vane 102, wherein FIG. 3A illustrates the vane 102 without an embodiment of a measuring device, and FIG. 3B illustrates same with an embodiment of a measuring device.

The vane 102 here is basically comparable to that illustrated in FIG. 2A, and therefore reference can be made to the description above. However, the vane 102 does not have the bearing device 105, and therefore the vane 102 is not pivotable. Furthermore, it can be seen in FIG. 3A that the vane 102 has openings 106 through which part of the core air flow A can flow for cooling purposes.

However, here too, a leakage flow L enters from the cavity 120 into the measuring space 110 in the interior of the vane 102 during operation. The measurement results of the measuring probe 100 are distorted as a result.

In the embodiment illustrated, the core air flow A has a substantially higher temperature than in the cavity 120 lying radially outside the vane 102.

If the leakage flow L with said lower temperature now flows into the measuring space 110 of the vane 102, the temperature especially in the inflow region in the vicinity of the probe device 100 is reduced, and therefore sensors of the probe device 100 measure too low a temperature. A possible overheating of the additional air from the core air flow A into the vane 102 thus cannot be detected.

By contrast, the vane 102 in the embodiment according to FIG. 3B has one of the measuring devices, in which an air-conducting device 101 removes air from the cavity 120 to the pressure sink D in a targeted manner. For this purpose, the air-conducting device 101 has a duct which is arranged in the holder of the probe device 100. Air flows through said duct from the cavity 120 to the pressure sink D which lies radially further on the outside. The pressure sink D does not necessarily have to be the bypass duct 22. It suffices, for example, if it is fluidically connected to the pressure sink D, i.e. a region with a lower pressure is generated.

Figure 4:
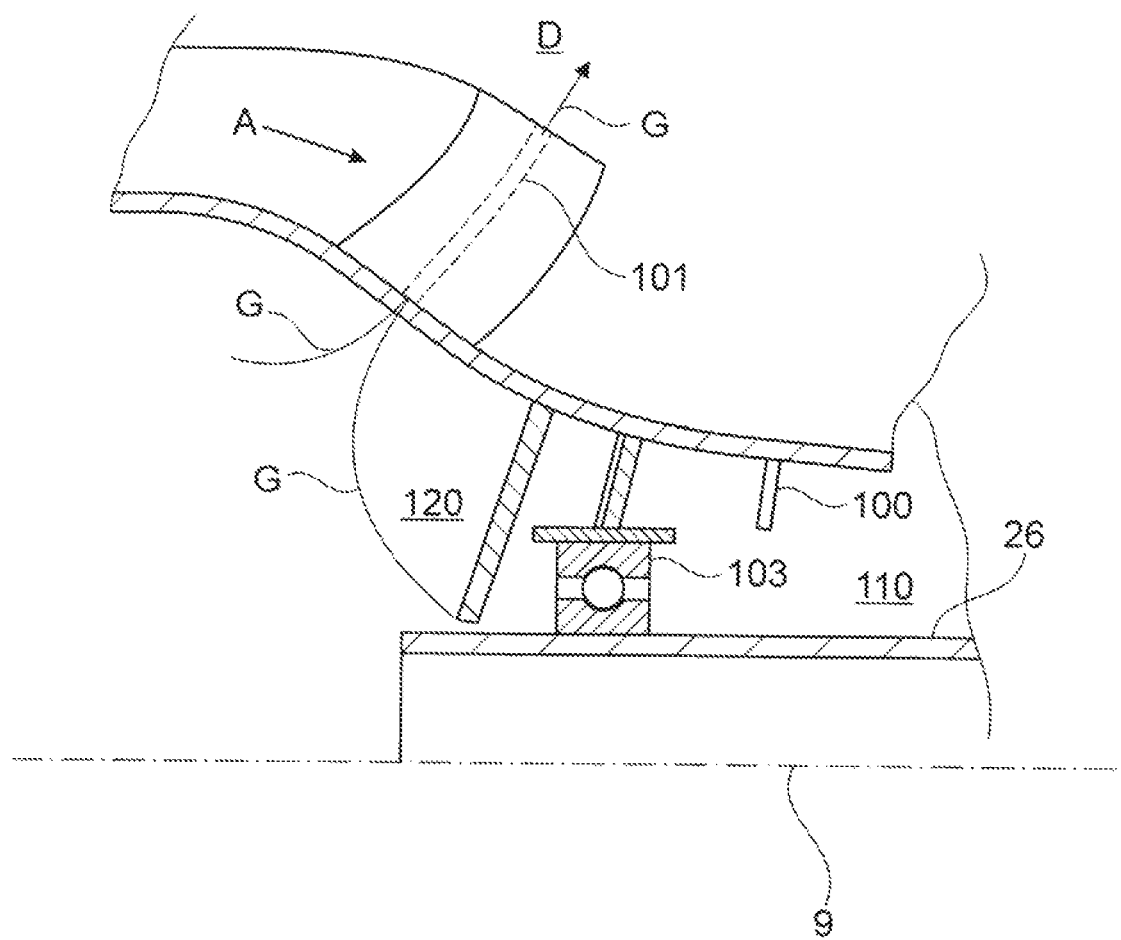
FIG. 4 shows a detailed sectional view of a cavity with a bearing with an embodiment of a measuring device.

FIG. 4 illustrates a different use of an embodiment of a measuring device. Here, a probe device 100 measures the temperature in the measuring space 110 surrounding a bearing 103 of a shaft 26. The measuring space 110 is more open here than the above-described measuring space 110 in the interior of the vane 102.

In principle, it would be possible for a leakage flow L (not illustrated here) to be able to flow from the adjacent cavity 120 lying axially upstream into the measuring space 110.

In order to prevent (or at least to minimize) the leakage flow L, an air-conducting device 101 is provided which produces a fluidic connection from the cavity 120 to the pressure sink D. The air-conducting device 101 leads radially outwards through the vane 102. An air flow G can therefore be removed from the cavity 120 in order as far as possible to prevent a leakage into the measuring space 110.

An analogous embodiment could also be used in conjunction with a measuring space 110 in which a seal is arranged instead of a bearing 103.

FIG. 5 illustrates a different use of an embodiment of a measuring device. A part of an encircling annular space that here is the measuring space 110 is illustrated in the sectional view. In the annular space, a rotating vane 102a and a static guide vane 102 are arranged one behind the other in the flow direction (arrow). The vanes 102a, 102 are, for example, part of a turbine stage 17, 18 which has more than one such pair of vanes.

A probe device 100 is arranged between the vanes 102, 102*a*, said probe device measuring the temperature (and/or the pressure) between the vanes 102, 102*a*. The probe device 100 projects in the radial direction into the measuring space 110.

The measuring space 110 is at least partially surrounded by a cavity 120 from which air could flow into the measuring space, i.e. both cavity and measuring space are fluidically connected to each other.

In the region of the passage of the probe device through the walls of the measuring space 110 and of the cavity 120, ducts are arranged in the form of the air-conducting device 105, through which the air can be sucked out of the cavity 120 by means of a fluidic connection to the pressure sink D. The pressure sink D lies radially further outside the cavity 120 and is connected, for example, to the bypass duct 22 or to the exterior (not illustrated here), wherein a lower pressure prevails at these locations than in the cavity 120.

The embodiments illustrated here comprise probe devices 100 which have sensors for temperature measurements. However, it is also possible to use other sensors which, for example, measure the pressure, a pressure difference, particles (for example in smoke) and/or a chemical composition (for example within the scope of the combustion). All of these measurements are directed towards the measuring conditions in the measuring space 110 being distorted as little as possible.

LIST OF REFERENCE SIGNS

9 Main axis of rotation
10 Aircraft engine, gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft
27 Connecting shaft
30 Transmission
100 Probe device
101 Air-conducting device
102 Vane (static)
102*a* Vane (rotating)
103 Bearing
105 Bearing device for a vane
106 Openings in vane
110 Measuring space
120 Cavity
A Core air flow
B Bypass air flow
D Pressure sink
G Fluid flow, gas flow/air flow
L Leakage flow

The invention claimed is:

1. A measuring device for an aircraft engine, the measuring device comprising:
   a measuring space positioned within a core air flow space configured to conduct a core air flow through a core engine of the aircraft engine;
   a cavity positioned outwardly of the core air flow space;
   a pressure sink having a lower pressure than the cavity;
   a probe device including a sensor for measuring a physical and/or chemical state in the measuring space, wherein the measuring space is fluidically connected to the cavity: and
   an air-conducting duct that has a fluid coupling between the cavity and the pressure sink and is configured to remove a fluid flow from the cavity to the pressure sink to minimize any flow from the cavity into the measuring space.

2. The measuring device according to claim 1, wherein the air-conducting duct includes an opening in a wall between the cavity and the pressure sink to establish the fluid coupling.

3. The measuring device according to claim 1, wherein the sensor is configured to measure temperature, pressure, particles and/or a chemical composition.

4. The measuring device according to claim 1, wherein the measuring space is arranged in a static part of the core engine.

5. The measuring device according to claim 1, wherein the measuring space is arranged in a vane of a turbine and/or of a compressor of the core engine.

6. The measuring device according to claim 5, wherein the vane is a first static vane of a low-pressure turbine in a flow direction.

7. The measuring device according to claim 1, wherein the measuring space is configured as an annular space between two turbine stages and/or compressor stages.

8. The measuring device according to claim 1, wherein the measuring space and/or the cavity is part of a secondary air supply system of the aircraft engine.

9. The measuring device according to claim 8, wherein the secondary air supply system of the aircraft engine is an internal cooling and blockage air system.

10. The measuring device according to claim 1, wherein the pressure sink is coupled fluid-mechanically to a bypass duct of the aircraft engine.

11. An aircraft engine including the measuring device according to claim 1.

12. The aircraft engine of claim 11, wherein the aircraft engine is a fan transmission engine.

13. The measuring device according to claim 1, wherein the fluid flow is a gas flow.

14. The measuring device according to claim 1, wherein the pressure sink is positioned outwardly of the cavity.

15. A measuring method for an aircraft engine, comprising:
   providing a measuring device comprising:
      a measuring space positioned within a core air flow space configured to conduct a core air flow through a core engine of the aircraft engine;
      a cavity positioned outwardly of the core air flow space;
      a pressure sink having a lower pressure than the cavity;
      a probe device including a sensor for measuring a physical and/or chemical state in the measuring space, wherein the measuring space is fluidically connected to the cavity: and
      an air-conducting duct that has a fluid coupling between the cavity and the pressure sink and is configured to remove a fluid flow from the cavity to the pressure sink to minimize any flow from the cavity into the measuring space;

measuring the physical and/or chemical state in the measuring space with the probe device; and removing the fluid flow from the cavity to the pressure sink using the air-conducting duct.

16. The measuring method according to claim 15, wherein the fluid flow is an air flow.

* * * * *